(12) United States Patent
Rudy et al.

(10) Patent No.: US 9,153,260 B1
(45) Date of Patent: Oct. 6, 2015

(54) ELECTRONIC LAPPING GUIDE IN A MAGNETIC RECORDING TRANSDUCER

(75) Inventors: Steven C. Rudy, San Jose, CA (US); Matthew R. Gibbons, San Jose, CA (US); Curtis V. Macchioni, Livermore, CA (US); Yun-Fei Li, Fremont, CA (US); Changhe Shang, Fremont, CA (US); Carlos Corona, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/419,313

(22) Filed: Mar. 13, 2012

Related U.S. Application Data

(62) Division of application No. 12/056,409, filed on Mar. 27, 2008, now Pat. No. 8,151,441.

(51) Int. Cl.
*G11B 5/31* (2006.01)
*G11B 5/455* (2006.01)

(52) U.S. Cl.
CPC .............. *G11B 5/455* (2013.01); *G11B 5/3166* (2013.01); *G11B 5/3169* (2013.01); *Y10T 29/49036* (2015.01); *Y10T 29/49037* (2015.01); *Y10T 29/49041* (2015.01); *Y10T 29/49048* (2015.01)

(58) Field of Classification Search
CPC .... G11B 5/455; G11B 5/3166; G11B 5/3169; Y10T 29/49041; Y10T 29/49048; Y10T 29/49037; Y10T 29/49036
USPC ................. 29/603.09, 603.1, 603.12, 603.15, 29/603.16, 593, 737; 324/691, 715, 716, 324/719; 451/8, 5, 41; 438/17
See application file for complete search history.

(56) References Cited

U.S. PATENT DOCUMENTS

| | | | |
|---|---|---|---|
| 4,157,497 A | 6/1979 | Eisen et al. |
| 4,670,732 A | 6/1987 | Church |
| 4,675,986 A | 6/1987 | Yen |
| 5,065,483 A | 11/1991 | Zammit |
| 5,210,667 A | 5/1993 | Zammit |
| 5,361,547 A | 11/1994 | Church et al. |
| 5,597,340 A | 1/1997 | Church et al. |
| 5,678,086 A | 10/1997 | Gandola et al. |
| 5,722,155 A | 3/1998 | Stover et al. |
| 5,742,995 A | 4/1998 | Amin et al. |
| 5,772,493 A | 6/1998 | Rottmayer et al. |
| 5,876,264 A | 3/1999 | Church et al. |

(Continued)

FOREIGN PATENT DOCUMENTS

| | | | |
|---|---|---|---|
| JP | 60153137 A | * | 8/1985 |
| JP | 2000067408 | | 3/2000 |

OTHER PUBLICATIONS

Matsushita, et al., "Elaborate Precision Machining Technologies for Creating High Added Value at Low Cost", Fujitsu Sci. Tech. J., 43, 1, pp. 67-75, Jan. 2007.

(Continued)

*Primary Examiner* — A. Dexter Tugbang

(57) ABSTRACT

A slider includes a transducer including a magnetic structure having a front edge and a back edge. The slider further includes an electronic lapping guide (ELG) substantially coplanar with the magnetic structure and having a top edge and a bottom edge. The slider further includes a plurality of pads configured to calibrate a sheet resistance of the ELG and an offset of the ELG.

9 Claims, 6 Drawing Sheets

(56) References Cited

U.S. PATENT DOCUMENTS

| | | | |
|---|---|---|---|
| 5,963,784 A * | 10/1999 | Bothra et al. | 324/716 X |
| 6,003,361 A | 12/1999 | Amin et al. | |
| 6,027,397 A | 2/2000 | Church et al. | |
| 6,029,339 A * | 2/2000 | Chang et al. | 29/603.15 X |
| 6,047,224 A | 4/2000 | Stover et al. | |
| 6,083,081 A | 7/2000 | Fukuroi et al. | |
| 6,131,271 A * | 10/2000 | Fontana et al. | 29/603.15 X |
| 6,193,584 B1 | 2/2001 | Rudy et al. | |
| 6,288,870 B1 | 9/2001 | Saliba | |
| 6,347,983 B1 | 2/2002 | Hao et al. | |
| 6,364,743 B1 | 4/2002 | Pust et al. | |
| 6,399,401 B1 | 6/2002 | Kye et al. | |
| 6,475,064 B2 | 11/2002 | Hao et al. | |
| 6,532,646 B2 | 3/2003 | Watanuki | |
| 6,609,948 B1 | 8/2003 | Fontana, Jr. et al. | |
| 6,623,330 B2 | 9/2003 | Fukuroi | |
| 6,674,610 B1 | 1/2004 | Thomas et al. | |
| 6,684,171 B2 | 1/2004 | Church et al. | |
| 6,699,102 B2 | 3/2004 | Reiley et al. | |
| 6,728,067 B2 | 4/2004 | Crawforth et al. | |
| 6,758,722 B2 | 7/2004 | Zhu | |
| 6,760,197 B2 | 7/2004 | Boutaghou et al. | |
| 6,786,803 B2 | 9/2004 | Crawforth et al. | |
| 6,793,557 B2 | 9/2004 | Bunch et al. | |
| 6,846,222 B2 | 1/2005 | Church et al. | |
| 6,857,937 B2 | 2/2005 | Bajorek | |
| 6,884,148 B1 | 4/2005 | Dovek et al. | |
| 6,935,923 B2 * | 8/2005 | Burbank et al. | 451/5 |
| 6,950,289 B2 | 9/2005 | Lam et al. | |
| 6,982,042 B2 | 1/2006 | Church et al. | |
| 7,014,530 B2 | 3/2006 | Kasiraj et al. | |
| 7,139,152 B2 | 11/2006 | Mahnad et al. | |
| 7,149,061 B2 | 12/2006 | Yamakura et al. | |
| 7,206,172 B2 | 4/2007 | Ding et al. | |
| 7,244,169 B2 | 7/2007 | Cyrille et al. | |
| 7,245,459 B2 | 7/2007 | Cyrille et al. | |
| 7,268,976 B2 | 9/2007 | Yamakura et al. | |
| 7,271,982 B2 | 9/2007 | MacDonald et al. | |
| 7,272,883 B2 | 9/2007 | Le et al. | |
| 7,287,316 B2 | 10/2007 | Kasahara et al. | |
| 7,333,300 B2 | 2/2008 | Church et al. | |
| 7,359,152 B2 | 4/2008 | Matono et al. | |
| 7,360,296 B2 | 4/2008 | Cyrille et al. | |
| 7,393,262 B2 | 7/2008 | Biskeborn | |
| 7,422,511 B2 | 9/2008 | Fukuroi | |
| 7,551,406 B1 | 6/2009 | Thomas et al. | |
| 7,554,767 B1 | 6/2009 | Hu et al. | |
| 7,564,110 B2 | 7/2009 | Beach et al. | |
| 7,603,762 B2 | 10/2009 | Baer et al. | |
| 7,643,250 B2 | 1/2010 | Araki et al. | |
| 7,716,814 B2 | 5/2010 | Sasaki et al. | |
| 7,770,281 B2 | 8/2010 | Pentek | |
| 7,788,796 B2 | 9/2010 | Hsiao et al. | |
| 7,861,400 B2 | 1/2011 | Lille | |
| 8,151,441 B1 | 4/2012 | Rudy et al. | |
| 8,165,709 B1 | 4/2012 | Rudy | |
| 8,291,743 B1 | 10/2012 | Shi et al. | |
| 8,307,539 B1 | 11/2012 | Rudy et al. | |
| 8,443,510 B1 | 5/2013 | Shi et al. | |
| 2001/0004800 A1 | 6/2001 | Yoshida et al. | |
| 2001/0051491 A1 | 12/2001 | Hao et al. | |
| 2002/0012204 A1 | 1/2002 | Boutaghou et al. | |
| 2002/0094758 A1 * | 7/2002 | Reiley et al. | 451/8 |
| 2002/0173227 A1 | 11/2002 | Lam et al. | |
| 2003/0020467 A1 | 1/2003 | Kasahara et al. | |
| 2003/0021069 A1 | 1/2003 | Crawforth et al. | |
| 2004/0009739 A1 | 1/2004 | Zhu | |
| 2004/0075942 A1 | 4/2004 | Bajorek | |
| 2004/0097173 A1 | 5/2004 | Crawforth et al. | |
| 2004/0179310 A1 | 9/2004 | Lam et al. | |
| 2005/0023673 A1 | 2/2005 | Nowak | |
| 2005/0028354 A1 | 2/2005 | Shindo et al. | |
| 2005/0070206 A1 | 3/2005 | Kasiraj et al. | |
| 2005/0164607 A1 | 7/2005 | Bajorek | |
| 2005/0180048 A1 | 8/2005 | MacDonald et al. | |
| 2005/0185345 A1 | 8/2005 | Ding et al. | |
| 2005/0219752 A1 | 10/2005 | Takahashi | |
| 2006/0027528 A1 | 2/2006 | Church et al. | |
| 2006/0028770 A1 | 2/2006 | Etoh et al. | |
| 2006/0034021 A1 | 2/2006 | Wu | |
| 2006/0044683 A1 | 3/2006 | Matono et al. | |
| 2006/0103990 A1 | 5/2006 | Ito et al. | |
| 2006/0126222 A1 | 6/2006 | Aoki et al. | |
| 2006/0139802 A1 | 6/2006 | Sasaki et al. | |
| 2006/0168798 A1 | 8/2006 | Naka | |
| 2007/0008660 A1 | 1/2007 | Yamakura et al. | |
| 2007/0070543 A1 | 3/2007 | Gunder et al. | |
| 2007/0246761 A1 | 10/2007 | Beach et al. | |
| 2008/0013219 A1 | 1/2008 | Wu | |
| 2008/0072418 A1 | 3/2008 | Kondo et al. | |
| 2008/0144215 A1 | 6/2008 | Hsiao et al. | |
| 2008/0273275 A1 | 11/2008 | Lille | |
| 2009/0152235 A1 | 6/2009 | Hsiao et al. | |
| 2009/0211081 A1 | 8/2009 | Boone, Jr. et al. | |
| 2009/0268348 A1 | 10/2009 | Bonhote et al. | |
| 2010/0162556 A1 | 7/2010 | Guruz et al. | |
| 2010/0165513 A1 | 7/2010 | Bonhote et al. | |
| 2010/0208391 A1 | 8/2010 | Gokemeijer | |

OTHER PUBLICATIONS

Office Action dated Mar. 21, 2011 from U.S. Appl. No. 12/056,409, 16 pages.

Notice of Allowance dated Dec. 8, 2011 from U.S. Appl. No. 12/056,409, 12 pages.

* cited by examiner

To Test Pattern

ELECTRONIC LAPPING GUIDE IN A MAGNETIC RECORDING TRANSDUCER

CROSS REFERENCE TO RELATED APPLICATIONS

This application is a divisional of U.S. patent application Ser. No. 12/056,409, filed on Mar. 27, 2008, and now issued as U.S. Pat. No. 8,151,441, which is hereby incorporated by reference in its entirety.

BACKGROUND

Conventional magnetic heads typically employ lapping to fabricate structures within the head. For example, lapping is typically used in processing a read sensor in a read transducer. Lapping determines the stripe height, or length measured from the air-bearing surface (ABS), of the read sensor. Similarly, lapping may be used in fabricating the main pole of a conventional write transducer. The nose length, or the distance from the ABS at which the pole tip widens, may also be determined through lapping.

In order to control lapping an electronic lapping guide (ELG) is typically used. FIG. 1 depicts a top view of a conventional ELG 10. The conventional ELG 10 is essentially a resistive stripe. Thus, the conventional ELG 10 is coupled with leads 14 and 16 that are used to determine the resistance of the conventional ELG 10. The conventional ELG has a length l from the surface 12 being lapped. As lapping continues, the surface 12 is worn away, and the length of the conventional ELG 10 decreases.

FIG. 2 is a flow chart depicting a conventional method 30 for performing lapping using the conventional ELG. The conventional method 30 is described in the context of the conventional ELG 10. The resistance of the conventional ELG 10 is measured during lapping of the transducer, via step 32. The current length of the conventional ELG 10 is determined based upon the resistance measured in step 32 and the sheet resistance of the conventional ELG 10, via step 34. The sheet resistance may be determined in a conventional manner using a conventional Van der Pauw pattern (not shown) which is provided on the substrate on which the magnetic transducer is to be fabricated. The conventional Van der Pauw test pattern is a well known pattern that may be used to determine sheet resistance of a stripe, such as the conventional ELG 10. Thus, after step 34, the length corresponding to a particular measured resistance for the conventional ELG 10 is known.

The lapping is terminated when the resistance of the conventional ELG 10 indicates that the desired length of the conventional ELG 10 has been reached, via step 36. Because the conventional ELG 10 and structure, such as a read sensor or pole, both exist on the transducer being lapped, the lengths of the conventional ELG 10 and the structure change with lapping. Consequently, the lengths of the read sensor or pole may also be set in step 36.

Although the conventional method 30 and conventional ELG 10 function, there may be variations in lapping. In particular, the method 10 may not provide the desired length in the structure being fabricated. For example, the pole and read sensor may not have the desired nose lengths and stripe heights. Consequently, once the transducer is completed, it is tested. It may then be determined that some portion of the transducers do not function as desired. As a result, additional inventory is maintained or additional transducers are fabricated to ensure the number and quality of transducers desired are available.

Accordingly, what is needed is an improved method for providing and using an ELG in a magnetic transducer.

SUMMARY

A method and system for providing an ELG for a structure in a magnetic transducer are described. The structure has a front edge and a back edge. The ELG includes a stripe having a top edge and a bottom edge. The method and system include calibrating a sheet resistance of the stripe and calibrating an offset of the top edge of the stripe from the back edge of the structure. The method and system further include terminating the lapping based at least on the sheet resistance and the offset of the ELG.

DETAILED DESCRIPTION OF THE PREFERRED EMBODIMENTS

Figure 1:
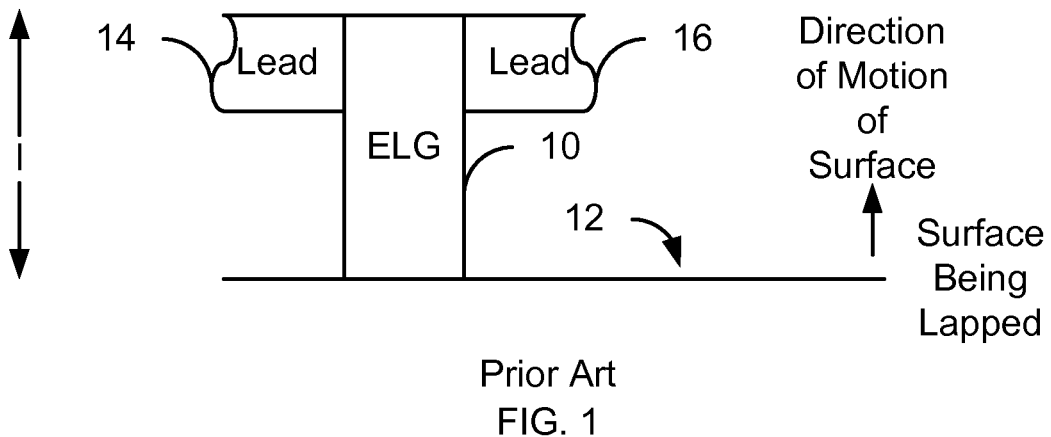
FIG. 1 depicts a conventional ELG as used in a conventional magnetic transducer.
Figure 2:
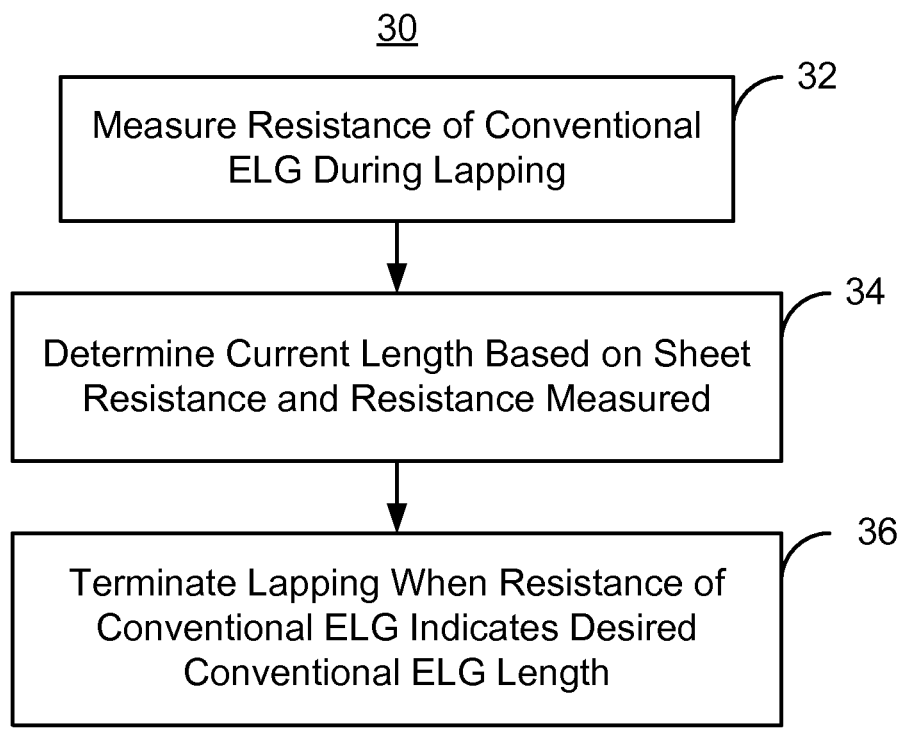
FIG. 2 is a flow chart depicting a conventional method for performing lapping utilizing a conventional ELG.
Figure 3:
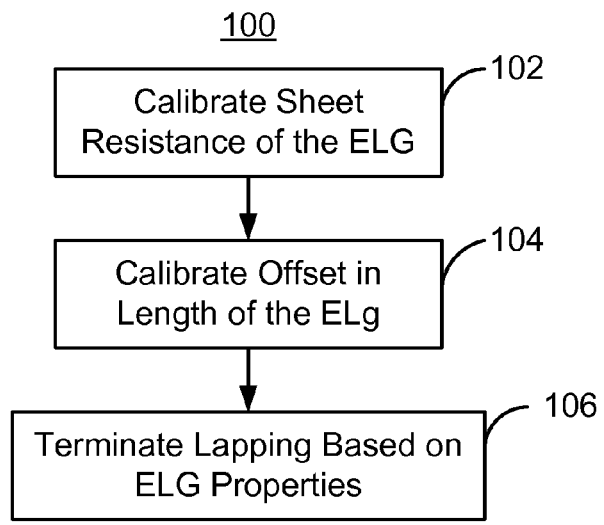
FIG. 3 is a flow chart depicting an exemplary embodiment of a method for providing and utilizing an ELG.
Figure 4:
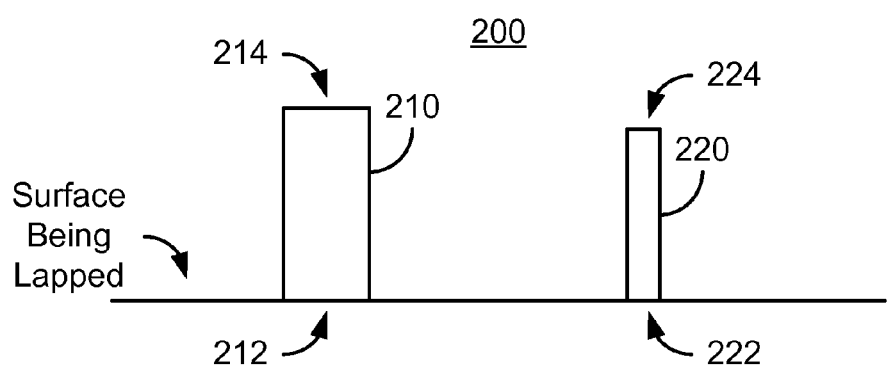
FIG. 4 depicts an exemplary embodiment of an ELG and the corresponding structure being fabricated in a transducer.

FIG. 3 is a flow chart depicting an exemplary embodiment of a method 100 for providing and utilizing one or more ELGs during fabrication of a magnetic transducer. For simplicity, some steps of the method 100 may be omitted. FIG. 4 depicts an exemplary embodiment of a portion of a transducer 200 for which the method 100 is used. The transducer 200 includes an ELG 210 and a structure 220. The transducer also includes leads (not shown) for the ELG 210 and might also include leads (not shown) for the structure 220. The transducer 200 may be part of a merged head including a read transducer and a write transducer. The transducer 200 may reside on a slider (not shown). The method 100 may be used for either or both transducers. The method 100 is also described in the context of a single structure 210 and a single ELG 210. However, the method 100 may be used for fabricating multiple transducers and/or multiple structures and may employ multiple ELG(s) at substantially the same time.

The structure 220 being fabricated has a front edge 222 and a back edge 224. For simplicity, the structure 220 is shown as a rectangle. However, in another embodiment, the structure 220 may have a different shape. In addition, the structure 220 is depicted as terminating at the back edge 224. However, in another embodiment, the back edge 224 may simply mark a relevant position. For example, for a pole, the back edge 224 may correspond to the end of the nose of the pole. The ELG includes a stripe having a top edge 214 and a bottom edge 212. The front edge 222 of the structure 220 and the bottom edge 212 of the ELG(s) 210 reside at the surface being lapped. In one embodiment, the ELG(s) 210 and the corresponding structure(s) 220 are coplanar. For example, a read ELG (RELG) being used in lapping a read sensor may be coplanar with the read sensor. Similarly, a write ELG (WELG) used in lapping a pole may be coplanar with the pole. In one embodiment, the stripe 210 may be a simple shape, such as a rectangle. In another embodiment, the stripe may have a different shape. The track width of the ELG(s) 210 may also be well controlled. For example, in one embodiment, the track width of an ELG 210 is controlled to be within one percent of the nominal track width. In one embodiment, the ELG(s) are placed in each flash field on a wafer being processed. In one embodiment, each ELG 210 is a tunneling magnetoresistive (MR) stripe.

The sheet resistance of the ELG 210 is calibrated, via step 102. In one embodiment, step 102 calibrates the sheet resistance of each stripe 210. This calibration may be performed using a known method, such as the Van der Pauw method.

Figure 5:
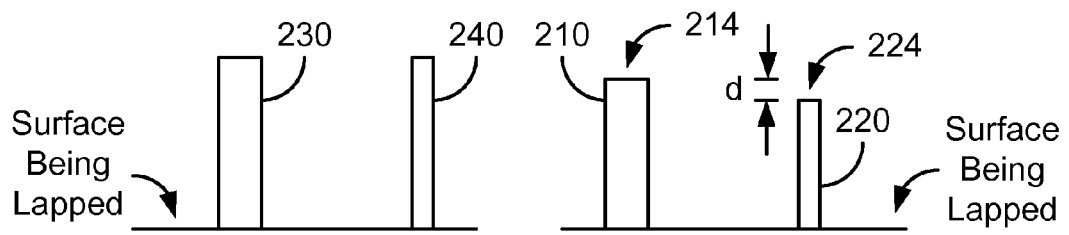
FIG. 5 depicts exemplary embodiments of masks and corresponding structures fabricated.

The offset of the top edge 214 of the ELG 210, or stripe 210, from the back edge 224 of the structure 210 is calibrated, via step 104. In one embodiment, the top edge 214 of each ELG 210 is designed to be the same distance from the surface being lapped as the back edge 224 of the structure 210. In such an embodiment, the mask(s) used to form each ELG 210 and the corresponding structure 220 have endpoints corresponding to the top edge 214 and the back edge 224, respectively, at the same distance from the surface to be lapped. However, due to fabrication conditions, there still may be an offset between the top edge 214 of the ELG 210 and the back edge 224 of the structure 220. For example, FIG. 5 depicts an exemplary embodiment of the masks 230 and 240 that might be used for the ELG 210 and structure 220, respectively. As seen in FIG. 5, although the ELG 210 and structure 220 are designed to terminate the same distance from the surface being lapped, both edges 214 and 224 differ from the masks 230 and 240. Consequently, there is a small offset, d, between the edges 214 and 224. If the transducer 200 is designed such that the top edge 214 of the ELG 210 is not even with the back edge 224 of the structure 220, the difference between these edges 214 and 224 may be increased from the desired amount by an analogous offset. Determination of the offset may improve the ability to determine the length of the structure 220 from the ELG 210. In one embodiment, a correction factor is determined in step 104 which allows the placement of the top edge 214 of the ELG 210 to be determined based on the masks used. In one embodiment, the offset is calibrated for both a WELG and a RELG in step 104.

Referring back to FIGS. 3-4, during fabrication of the corresponding structure 220, lapping is terminated based on the properties of the ELG, via step 106. Step 106 also includes terminating lapping based at least on the sheet resistance and the offset calibrated in steps 102 and 104. In one embodiment, the resistance of an ELG 210 is measured during lapping. Based on the offset, the resistance, and the sheet resistance, the length of not only the ELG 210 but also the structure 220 can be determined. When the resistance of ELG 210 indicates the desired length of the ELG 210 has been reached, the desired length of the structure 220 has also been reached. Thus, lapping is terminated.

Through the use of the method 100, the lapping may be significantly better controlled. As a result, structures such as read sensors and portions of the pole(s) may be lapped closer to the desired goals. As a result the fabrication may be improved. In particular, large variations in the structures which may adversely affect device performance may be avoided. Device manufacturability and performance may thus be improved.

Figure 6:
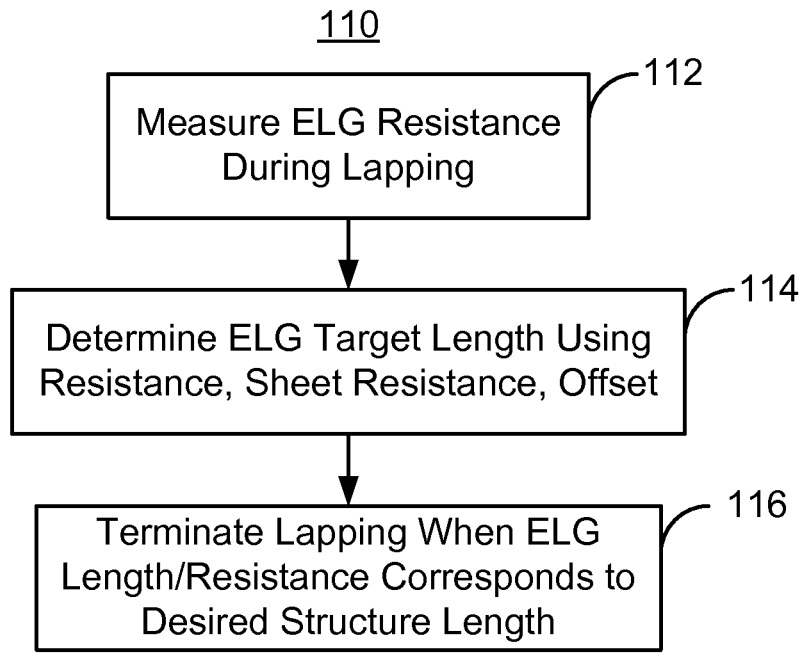
FIG. 6 is a flow chart depicting another exemplary embodiment of a method for performing lapping utilizing an ELG.

FIG. 6 is a flow chart depicting an exemplary embodiment of a method 110 for performing lapping utilizing ELG(s). For simplicity, some steps may be omitted. The method 110 is also described in the context of the transducer 200. Referring to FIGS. 4 and 6, the method 110 may be considered to commence as or after lapping has started. The lapping performed in the method 110 is used to fabricate structure(s) in a read transducer and/or a write transducer.

The resistance of the ELG 210 is measured during lapping, via step 112. Well known techniques may be used to perform the resistance measurement. Step 112 may include taking multiple resistance measurements during lapping. For example, the resistance of the ELG 210 may be measured substantially continuously for at least a portion of the lapping performed.

Based on the resistance, the sheet resistance calibration performed in step 102 of the method 100, and the offset calibration performed in step 104 of the method 100, the target length of the ELG 210 is determined, via step 114. The target length of the ELG 210 corresponds to the target length of the structure 220 being fabricated. In one embodiment, the back edge 224, such as the back end of the read sensor or the end of the nose of a pole, is designed to be the same distance from the surface being lapped as the top edge 214 of the ELG 210. However, there may be some offset, which may be calibrated using step 104 of the method 100. Thus, in step 114 the correspondence between the resistance of the ELG 210 and the lengths of the ELG 210 and structure 220 can be determined. The lapping is terminated when the resistance of the ELG 210 indicates that the target length of the ELG 210, and thus the desired length of the structure 220, has been reached, via step 116.

The ELG 210 may thus be used to control lapping. Because both the sheet resistance and the offset of the ELG 210 have been calibrated, the target length of the ELG 210 may be better determined in step 114. Lapping can thus be better controlled. As a result, variations in lapping may be reduced. Consequently, the structure 220 may have a length closer to the desired length. For example, variations in the stripe height of a read sensor and the nose length of a pole may be reduced. Device manufacturability and performance may thus be better controlled.

Figure 7:
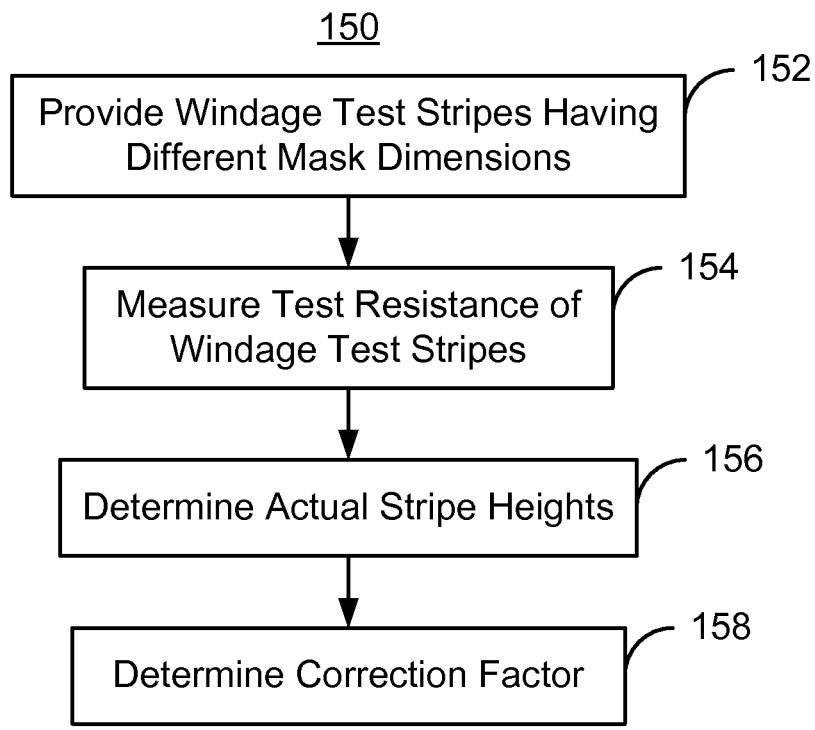
FIG. 7 is a flow chart depicting an exemplary embodiment of a method for calibrating the offset of an ELG.

FIG. 7 is a flow chart depicting an exemplary embodiment of a method 150 for calibrating the offset of ELG(s). As discussed with respect to the methods 100 and 110, the offset of the ELG is calibrated. The method 150 may thus be used in performing step 104 of the method 100. For simplicity, some steps may be omitted. The method 150 is also described in the context of a single ELG. However, the method 150 may be used for calibrating multiple ELGs at substantially the same time.

Figure 8:
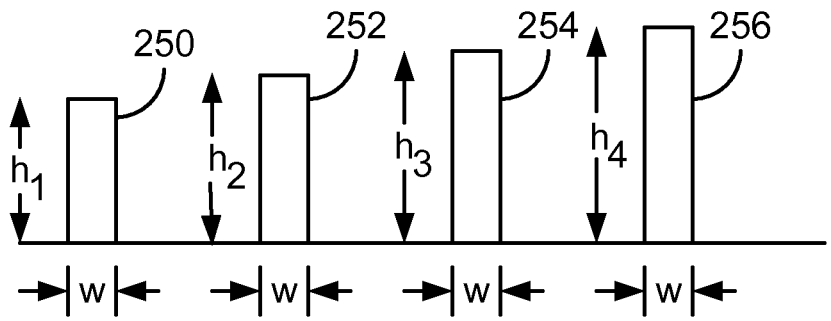
FIG. 8 is a diagram depicting an exemplary embodiment of test sites for calibrating the offset of an ELG.

A plurality of windage test stripes is provided, via step 152. The windage test stripes have a differing heights corresponding to a plurality of mask dimensions. FIG. 8 is a diagram depicting an exemplary embodiment of test stripes 250, 252, 254, and 256 provided in step 152. For clarity, FIG. 8 is not to scale. For example, in one embodiment, the length, $h_i$, of a test stripe may vary by other amounts not shown in FIG. 8. In one embodiment, the widths of the stripes 250, 252, 254, and 256 are known to a high degree of accuracy. For example, the width, w, of each stripe 250, 252, 254, and 256 may be greater than one hundred times the variation in the width. In the embodiment shown, the widths of the stripes 250, 252, 254, and 256 are the same. However, in another embodiment, the widths may vary. Windage test stripes 250, 252, 254, and 256 shown are substantially rectangular in shape. However, in another embodiment, stripes having another shape may be used. The test stripes 250, 252, 254, and 256 have varying heights $h_1$, $h_2$, $h_3$, and $h_4$. The varying heights $h_1$, $h_2$, $h_3$, and $h_4$ correspond to different dimensions for the masks (not shown) used in forming the stripes 250, 252, 254, and 256, respectively. The test stripes 250, 252, 254, and 256 provided in step 152 may be formed on the same substrate as the transducer(s) being fabricated. For example, the windage test stripes may be formed in part of a wafer that is not part of the final device. In another embodiment, the transducer may be configured such that the windage test stripes 250, 252, 254, and 256 are part of the transducer. In one embodiment, one set of windage test stripes are provided for each ELG in each flash field. For example, one set of windage test stripes may be provided for a RELG and another set of windage test stripes may be provided for the WELG. In such a case, the windage stripes for the RELG may have different shapes and/or configuration than those for the WELG.

A test resistance for the windage test stripes 250, 252, 254, and 256 is measured, via step 154. The stripe height for the windage test stripes 250, 252, 254, and 256 is determined, via step 156. The actual stripe heights $h_1$, $h_2$, $h_3$, and $h_4$ may be determined based on a known sheet resistance of the stripes 250, 252, 254, and 256, the resistances of the stripes 250, 252, 254, and 256, and the width, w, of the stripes. The length is given by the sheet resistance multiplied by the width and divided by the resistance measured.

A correction factor between the heights and the mask dimensions is determined using the lengths determined in step 156 and the mask dimensions, via step 158. The correction factor determined in step 158 may be used to account for differences in the actual heights of structures formed.

Through the use of the method 150, calibration of the ELG may be improved. In particular, the differences between the designed length as expressed in the masks and the actual lengths of the ELGs may be determined. As a result of this calibration, the differences between the lengths of the ELGs and the lengths of the structures being fabricated may be better determined. Consequently, the ELG may provide a more accurate indication of the height of the structure being fabricated. When used in connection with the methods 100 and 110, lapping may be improved.

Figure 9:
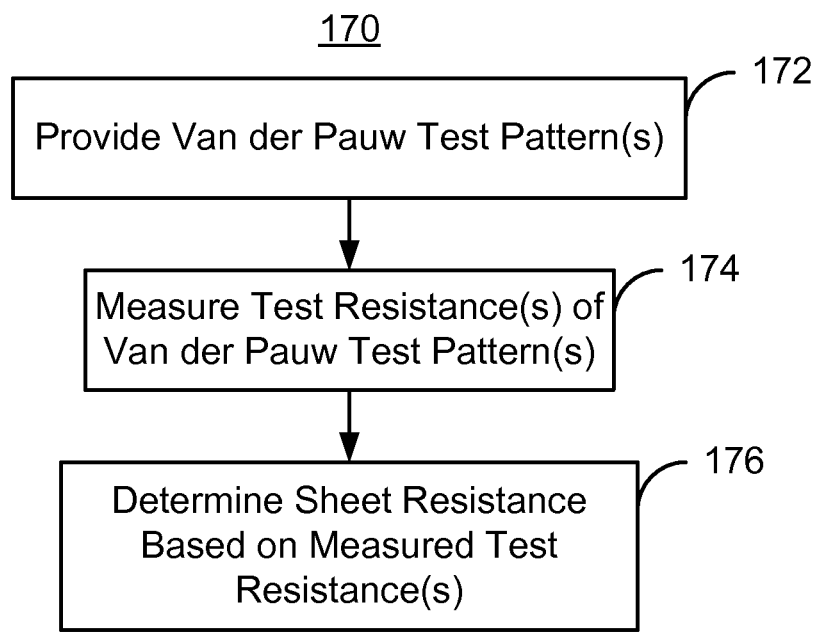
FIG. 9 is a flow chart depicting an exemplary embodiment of a method for calibrating the sheet resistance of an ELG.

FIG. 9 is a flow chart depicting an exemplary embodiment of a method 170 for calibrating the sheet resistance of ELG (s). As discussed with respect to the methods 100 and 110, the sheet resistance of the ELG is calibrated. The method 170 may be used in performing step 102 of the method 100. For simplicity, some steps may be omitted. The method 170 is also described in the context of a single ELG. However, the method 170 may be used for calibrating multiple ELGs at substantially the same time.

One or more Van der Pauw test patterns are provided for a corresponding ELG, via step 172. The Van der Pauw test pattern is fabricated of the same materials as the ELG. In one embodiment, each ELG has at least one corresponding Van der Pauw test pattern. Thus, each flash field may have at least one corresponding Van der Pauw test pattern. Van der Pauw test patterns are one well known mechanism for determining sheet resistance. However, in another embodiment, other test patterns might be used.

One or more test resistance measurements are taken for the Van der Pauw test pattern via step 174. In one embodiment, a single test resistance measurement might be used. However, in another embodiment, multiple measurements are taken for each test pattern. Based on these test resistance measurements and the known geometry of the Van der Pauw test pattern, the sheet resistance of the ELG may be determined, via step 176.

The method 170 allows for calibration of the sheet resistance of the ELG(s) used. In particular, the wafer-to-wafer variations in the sheet resistance of the ELG may be accounted for. In combination with the improved calibration of the offset(s) for the ELG(s), the target length of the ELGs may be better determined. In addition, resistance of the ELG corresponding to the desired length of the structure may be better determined. Consequently, lapping may be improved.

Figure 10:
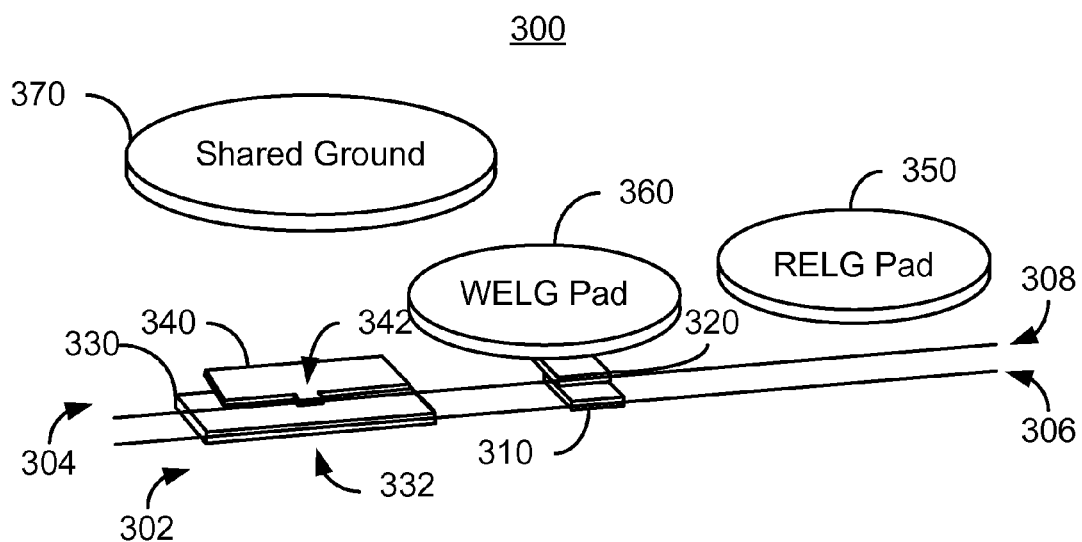
FIG. 10 is a diagram depicting an exemplary embodiment of a head utilizing ELGs.
Figure 11:
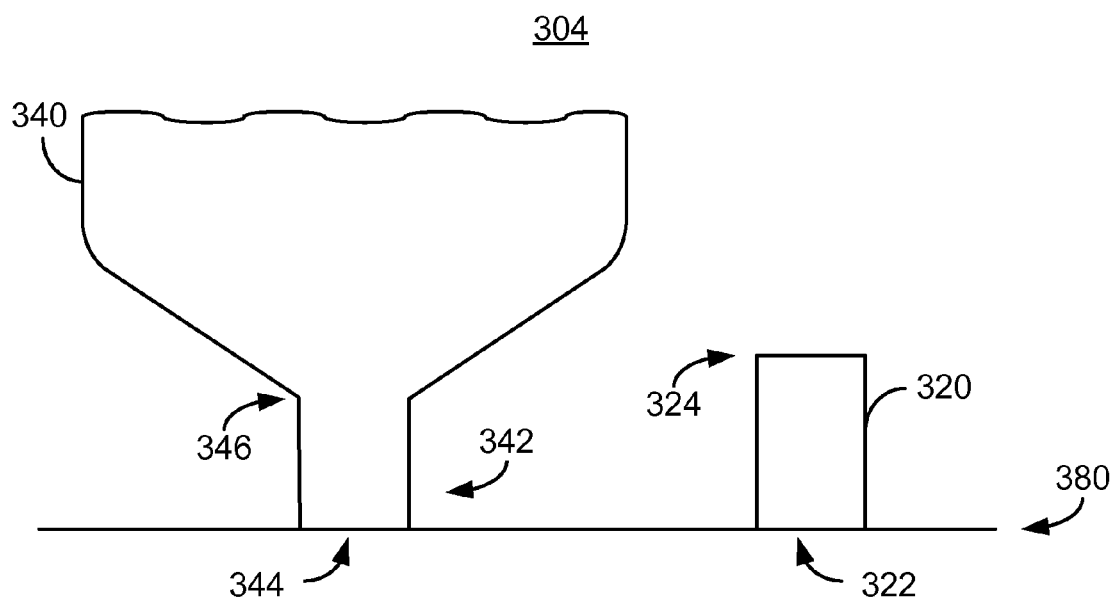
FIG. 11 is a diagram depicting an exemplary embodiment of a transducer utilizing ELGs.
Figure 12:
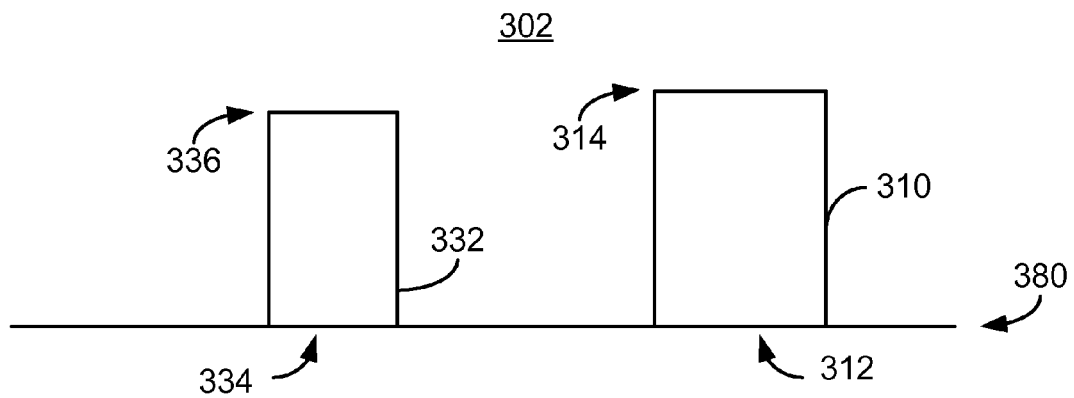
FIG. 12 is a diagram depicting an exemplary embodiment of a transducer utilizing ELGs.
Figure 13:
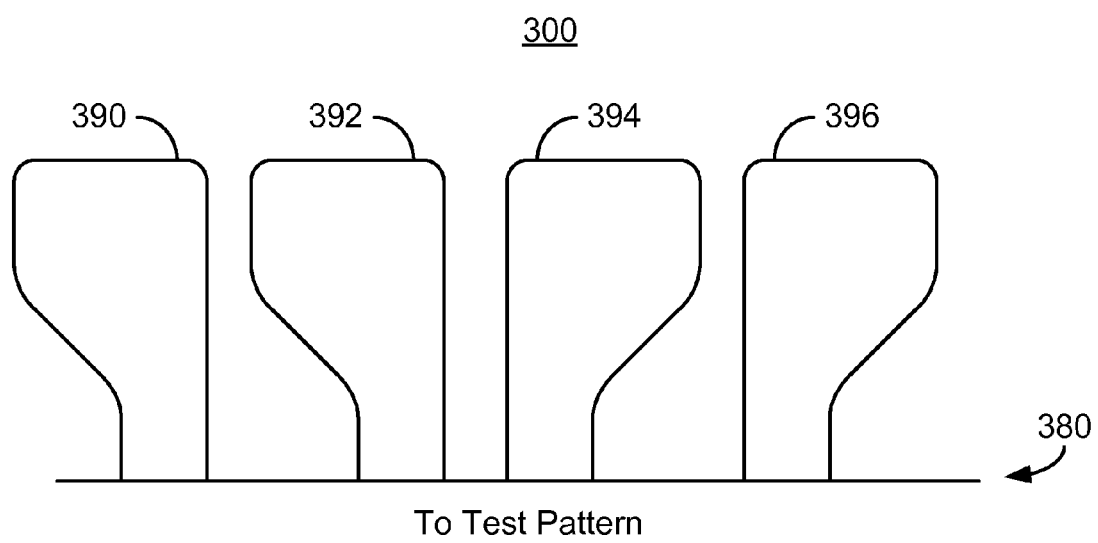
FIG. 13 is a diagram depicting an exemplary embodiment of a portion of a head utilizing ELGs.

FIGS. 10-13 are diagrams depicting an exemplary embodiment of a head 300 utilizing ELGs and fabricated in accordance with the methods 100, 110, 150, and 170. The head 300 includes a read transducer 302 and a write transducer 304. For clarity, only a portion of the transducers 302 and 304 are shown. In addition, FIGS. 10-13 are not drawn to scale. FIG. 10 is a perspective view of the head 300. FIG. 11 is a diagram depicting a top view of a portion of the write transducer 304. FIG. 12 is a diagram depicting a top view of the read transducer 306. FIG. 13 depicts a portion of the leads in the head 300.

Referring to FIGS. 10-13, the read transducer 302 includes a reader structure 330 including a read sensor 332. The reader structure 330, and more specifically the read sensor 332, resides substantially in the plane 306. Other structures (not shown) may also be part of the read transducer 302. In addition, a RELG 310 resides substantially in the plane 306. Consequently, the RELG 310 and the read sensor 332 are substantially coplanar. Similarly, the write transducer 304 includes a main pole 340 having a nose 342. The pole 340 resides substantially in the plane 308. Other structures, such as other poles and coil(s) (not shown) are also part of the write transducer 304. In addition, a WELG 320 resides substantially in the plane 308. Consequently, the WELG 320 and the pole 340 are substantially coplanar. Formation of the RELG 310 and WELG 320 may be performed as the read sensor 332 and pole 340 are fabricated. For example, the WELG 320 may be shaped using masks utilized for the trimming of the pole 340. Pads 350, 360, and 370 are also shown. In addition, for an embodiment in which a metal gap layer (not shown) is used above the pole 340, it may be desirable to deposit an insulating film (not shown) on the WELG 320 prior to deposition of the gap layer in order to reduce the risk of shorting of the WELG 320. In the embodiment depicted, one RELG 310 and one WELG 320 for the read transducer 302 and the write transducer 304, respectively, are shown. In another embodiment, multiple RELGs and/or multiple WELGs may be used.

In the embodiment depicted, the shared ground pad 370 is used for both the WELG 320 and the RELG 310. Use of a shared ground pad 370 may enable closer placement of the RELG 310 and WELG 320 to the read sensor 332 and pole 340, respectively. Further, in order to reduce the number of fabrication processes specific to the WELG 320, contacts are providing through the films provided during fabrication of the transducer 304 to allow electrical contact to the WELG 320.

The WELG 320 has a bottom edge 322 at the surface 380 being lapped and a top edge 324. The pole 340 has a front edge 344 at the surface being lapped and a back edge 346 at the end of the nose 342, where the pole 340 widens. The RELG 310 has a bottom edge 312 at the surface 380 being lapped and a top edge 314. The read sensor 332 has a front edge 334 at the surface 380 being lapped and a back edge 336 at the end of read sensor 332. Through the use of the methods 100, 150, and 170, the offset of the edges 324 and 346 and the offset between the edges 314 and 336 may be calibrated.

Also shown are pads 390, 392, 394, and 396. In one embodiment, the pads 390, 392, 394, and 396 may reside above the pads 350 and 360. The pads 390, 392, 394, and 396 are used to make contact to leads for a Van der Pauw test pattern (not shown) or windage test stripes (not shown in FIGS. 10-13) that are not part of the head 300. In the embodiment shown, the Van der Pauw test pattern and windage test stripes are, instead formed on a portion of the substrate that is removed from the head 300 during fabrication. However, in another embodiment, the Van der Pauw test pattern and/or the windage test stripes might be included in the head 300. In the embodiment shown, four pads 390, 392, 394, and 396 are used for a four point measurement for the windage test stripes or the Van der Pauw test pattern. However, in another embodiment, another number of pads and/or another measurement may be used.

Using the methods 100, 150, and 170, the sheet resistances and offsets of the RELG 310 and WELG 320 may be calibrated. Further, the RELG 310 and WELG 320 may be employed to control lapping of the surface 380. As a result, variations in the lapping and, therefore, in the lengths of the nose 342 and read sensor 332 may be reduced. Consequently, manufacturability and performance of the head 300 may be improved.

We claim:

1. A slider comprising:
   a transducer including a magnetic structure having a front edge and a back edge;
   an electronic lapping guide (ELG) substantially coplanar with the magnetic structure and having a top edge and a bottom edge; and
   a plurality of pads configured to calibrate a sheet resistance of the ELG and an offset of the ELG;
   a plurality of windage test stripes having a plurality of windage lengths in a direction perpendicular to the front edge of the magnetic structure, the plurality of windage test stripes being separate from any transducer including the transducer;
   wherein the plurality of pads is configured to be connected to a plurality of leads for the plurality of windage test stripes, the plurality of windage test stripes for determining the offset between the top edge of the ELG and the back edge of the magnetic structure.

2. The slider of claim 1 wherein the plurality of pads is configured to be connect to at least one Van der Pauw pattern corresponding to the ELG, the at least one Van der Pauw pattern for determining the sheet resistance of the ELG.

3. The slider of claim 1 wherein the transducer is a read transducer, the magnetic structure is a read sensor, and wherein the ELG is a read electronic lapping guide.

4. The slider of claim 3 further comprising:
   a write transducer including a first pole, a main pole, and at least one coil for energizing the main pole, the main pole including a nose and a yoke;
   a write electronic lapping guide (WELG) substantially coplanar with the main pole.

5. The slider of claim 1 wherein the transducer is a write transducer, the magnetic structure is a pole and wherein the ELG is a write electronic lapping guide.

6. The slider of claim 1 wherein the ELG is a tunneling magnetoresistive stripe.

7. The slider of claim 1 wherein the plurality of windage test stripes are electrically isolated from the magnetic structure.

8. A slider comprising:
   a transducer including a magnetic structure having a front edge and a back edge and a plurality of windage test stripes, the plurality of windage test stripes having a plurality of windage lengths in a direction perpendicular to the front edge of the magnetic structure, the plurality of windage test stripes being physically separated from the magnetic structure by a nonzero distance;
   an electronic lapping guide (ELG) substantially coplanar with the magnetic structure and having a top edge and a bottom edge,
   a plurality of pads configured to calibrate a sheet resistance of the ELG and an offset of the ELG;
   wherein the plurality of pads is configured to be connected to a plurality of leads for the plurality of windage test stripes, the plurality of windage test stripes for determining the offset between the top edge of the ELG and the back edge of the magnetic structure.

9. The slider of claim 8 wherein the plurality of windage test stripes are electrically isolated from the magnetic structure.

* * * * *